United States Patent
Honda et al.

(10) Patent No.: US 6,864,491 B2
(45) Date of Patent: Mar. 8, 2005

(54) RADIATION IMAGE CONVERSION PANEL

(75) Inventors: Satoshi Honda, Hachioji (JP); Osamu Morikawa, Hachioji (JP)

(73) Assignee: Konica Corporation (JP)

( * ) Notice: Subject to any disclaimer, the term of this patent is extended or adjusted under 35 U.S.C. 154(b) by 201 days.

(21) Appl. No.: 10/361,967

(22) Filed: Feb. 10, 2003

(65) Prior Publication Data

US 2003/0151001 A1 Aug. 14, 2003

(30) Foreign Application Priority Data

Feb. 14, 2002 (JP) .......................... 2002-036700

(51) Int. Cl.[7] .............................................. G03B 42/02
(52) U.S. Cl. .................................................. 250/484.4
(58) Field of Search ............................ 250/484.4, 581

(56) References Cited

U.S. PATENT DOCUMENTS 6,730,919 B2 * 5/2004 Shoji et al. .............. 250/484.4

* cited by examiner

*Primary Examiner*—David Porta
*Assistant Examiner*—Marcus Taningco
(74) *Attorney, Agent, or Firm*—Cantor Colburn LLP

(57) ABSTRACT

A radiation image conversion panel comprising a support provided thereon a stimulable phosphor layer and a protective layer including an alumina-evaporated layer, wherein the protective layer has a light transmittance of not more than 80% to light having a wavelength of not more than 400 nm and has a light transmittance of not less than 80% to light having a wavelength of not less than 410 nm, and the stimulable phosphor layer comprises a stimulable phosphor having a maximum emission in a wavelength of not less than 410 nm.

12 Claims, 1 Drawing Sheet

RADIATION IMAGE CONVERSION PANEL

FIELD OF THE INVENTION

The present invention relates to a radiation image conversion panel.

BACKGROUND OF THE INVENTION

Radiation images represented by X-ray images are employed in a number of fields, such as for medical diagnoses. Mainly utilized as a method for preparing the X-ray images is a so-called radiographic system in which radiation, which has passed through an object, is irradiated onto a phosphor layer (also called a fluorescent screen) resulting in visible light which exposes a silver halide light-sensitive photographic material (hereinafter referred to simply as a light-sensitive material) and the resulting light-sensitive material is subjected to photographic processing to prepare a visible image.

In recent years, however, a new method has been proposed in which images are directly captured from a phosphor layer instead of the image forming method employing light-sensitive materials comprising silver halides.

The aforesaid method comprises a process of rendering a phosphor to absorb the radiation which has passed through an object, subsequently a process of exciting the resulting phosphor employing light or heat energy so that radiation energy, which has been stored by said phosphor through absorption of X-rays, is emitted as fluorescence, and a process of forming images while inspecting the resulting fluorescence. Specifically, the method refers to a radiation image conversion method utilizing a stimulable phosphor described, for example, in U.S. Pat. No. 3,859,527 and Japanese Patent Publication Open to Public Inspection No. 55-12144.

This method utilizes a radiation image conversion panel comprising stimulable phosphors. In more detail, radiation, which has passed through an object, is incident to the stimulable phosphor layer of the radiation image conversion panel and radiation energy corresponding to transmitted radiation intensity of each portion of the object is stored. Thereafter, the resulting stimulable phosphor is sequentially subjected to stimulation, employing electromagnetic waves (stimulation light), such as visible light, and infrared rays, so that radiation energy stored in the stimulable phosphor is released as stimulated luminescence. The resulting signals, depending on variation of light intensity, are subjected, for example, to photoelectric conversion to obtain electrical signals. The resulting signals are employed to reproduce visible images on conventional image recording materials such as silver halide light-sensitive photographic materials or on image display apparatuses such as a CRT.

Compared to radiography in which conventional radiographic light-sensitive materials and intensifying screens are employed in combination, the aforesaid reproduction method of radiation image recording exhibits advantages such that it is possible to obtain radiation images with ample information, while utilizing substantially reduced radiation exposure.

These radiation image conversion panels comprise a support having thereon a stimulable phosphor layer or a self-supporting stimulable phosphor layer. The stimulable phosphor layer is comprised of stimulable phosphors as well as binders which disperse-support the stimulable phosphors, or is comprised of only coagulated phosphors formed by a vacuum evaporation method or a sintering method. Further, also known are those in which voids in the coagulated phosphor are impregnated with polymers. Further, generally provided on the surface opposite the support side of the stimulable phosphor layer is a protective layer such as a polymer film or an inorganic material vacuum-evaporated layer.

As noted above, these stimulable phosphors are phosphors which result in stimulated luminescence when stimulation light is irradiated after irradiating radiation. In practice, phosphors are commonly used which result in stimulated luminescence in the wavelength region of 300 to 500 nm, utilizing stimulation light in the wavelength region of 400 to 900 nm. Stimulable phosphors which have conventionally been employed in the radiation image conversion panel include, for example, rare earth element activated alkaline earth metal fluorinated halide based phosphors described in Japanese Patent Application Open to Public Inspection Nos. 55-12145, 55-160078, 56-74175, 56-116777, 57-23673, 57-23675, 58-206678, 59-27289, 59-27980, 59-56479, and 59-56480; divalent europium activated alkaline earth metal halide based phosphors described in Japanese Patent Application Open to Public Inspection Nos. 59-75200, 60-84381, 60-106752, 60-166379, 60-221483, 60-228592, 60-228593, 61-23679, 61-120882, 61-120883, 61-120885, 61-235486, and 61-235487; rare earth element activated oxyhalide phosphors described in Japanese Patent Application Open to Public Inspection No. 59-12144; cerium activated trivalent metal oxyhalide phosphors described in Japanese Patent Application Open to Public Inspection No. 58-69281; bismuth activated alkaline metal halide based phosphors described in Japanese Patent Application Open to Public Inspection No. 60-70484; divalent europium activated alkaline earth metal halophosphate phosphors described in Japanese Patent Application Open to Public Inspection Nos. 60-141783 and 60-157100; divalent europium activated alkaline earth metal borate phosphors described in Japanese Patent Application Open to Public Inspection No. 60-157099; divalent europium activated alkaline earth metal hydrogenated halide phosphors described in Japanese Patent Application Open to Public Inspection No. 60-217354; cerium activated rare earth element composite halide phosphors described in Japanese Patent Application Open to Public Inspection Nos. 61-21173 and 61-21182; cerium activated rare earth element halophosphate phosphors described in Japanese Patent Application Open to Public Inspection No. 61-40390; divalent europium activated cerium-rubidium halide phosphors described in Japanese Patent Application Open to Public Inspection No. 60-78151; divalent europium activated halogen phosphors described in Japanese Patent Application Open to Public Inspection No. 60-78153; and tetradecahedron rare earth metal activated alkaline earth metal fluorinated halide based phosphors deposited from a liquid phase, described in Japanese Patent Application Open to Public Inspection No. 7-233369.

Of the aforesaid stimulable phosphors, iodine-containing divalent europium activated alkaline earth metal fluorinated halide based phosphors, iodine-containing divalent europium activated alkaline earth metal halide based phosphors, iodine-containing rare earth element activated rare earth oxyhalide based phosphors, and iodine-containing bismuth activated alkaline metal halide based phosphors result in stimulated luminescence with high luminance.

Radiation image conversion panels, which employ these stimulable phosphors, store radiation image information and subsequently release stored energy after being scanned with stimulation light. As a result, after such scanning, it is possible to repeatedly store radiation images. One advantage of such a radiation image conversion panel is its repeated usability. Namely, in conventional radiography, radiographic materials are consumed for every image capture. Contrary to this, in the radiation image conversion method, it is more advantageous from the viewpoint of resource conservation as well as economic efficiency, because it is possible to repeatedly use the same radiation image conversion panel.

Under the aforesaid practice, it has been strongly desired that a radiation image conversion panel is durable for use over an extended period of time without deteriorated image quality of the resulting radiation images.

However, when the aforesaid stimulable phosphors, which are employed to produce the radiation image conversion panel, are set idle under common weather conditions over an extended period of time, problems occur in which characteristics are degraded during storage due to humidity as well as radiation such as ambient ultraviolet rays.

For example, when a stimulable phosphor is set aside under highly humid conditions, radiation sensitivity decreases due to an increase in adsorbed moisture. Further, when set aside in a place which is exposed to high energy radiation such as ultraviolet radiation, the stimulable phosphor is subjected to partial decomposition, resulting in a decrease in radiation sensitivity. Generally, the latent image of a radiation image fades over time after irradiation of radiation. As a result, the strength of reproduced radiation image signals characteristically decreases as the time from irradiance of radiation to scanning by stimulation light increases. Further, as stimulable phosphor absorbs moisture, the rate of the aforesaid latent image fading accelerates, resulting in critical problems. When stimulable phosphor, which has absorbed moisture or has degraded due to radiation such as ultraviolet radiation during reading of the resulting radiation image, reproduction of subsequent signals is degraded.

In order to minimize the aforesaid degradation of stimulable phosphors due to moisture absorption, methods heretofore have been proposed and employed in which a stimulable phosphor layer is covered with a moisture resistant protective layer which exhibits low moisture permeability, or phosphor particles are subjected to a hydrophobic treatment so that less moisture reaches the phosphor layer.

Known as methods for preparing low moisture permeable protective layers are those in which glass plates or thick high-barrier resinous films are employed, or laminated films are employed which are prepared by laminating 2 to 8 layers of film which comprises polyethylene terephthalate film vacuum-evaporated with a thin glass layer comprised of metal oxides and silicon nitrides. However, when the aforesaid methods are employed, problems occur in which the sharpness of the resulting radiation images is degraded due to an increase in thickness of the protective film itself.

Further, the use of an aluminum oxide (alumina) evaporated layer results in excellent moisture resistance. However, especially when the alumina evaporated layer is prepared so as to have high moisture resistance, problems have still occurred in which light intensity, emitted by stimulable phosphors, decreases due to absorption of the emitted light by the alumina-evaporated layer.

Japanese Patent Application Open to Public Inspection No. 11-249343 describes an embodiment in which the entire phosphor plate is protected by employing a sealing material. However, when alkali halide phosphors exhibiting high moisture absorbability are employed, the resulting moisture resistance is insufficient. As a result, further improvements are desired.

SUMMARY OF THE INVENTION

An aspect of the present invention is to provide a radiation image conversion panel which exhibits high moisture resistance as well as high durability, and results in sufficiently emitted light intensity and high image sharpness.

The aforesaid aspect of the present invention was achieved employing Structures described below.

Structure 1

A radiation image conversion panel comprising a support provided thereon a stimulable phosphor layer and a protective layer of the stimulable phosphor layer, the protective layer including an alumina-evaporated layer. The protective layer has a light transmittance of not more than 80% to light having a wavelength of not more than 400 nm. Further, the protective layer has a light transmittance of not less than 80% to light having a wavelength of not less than 410 nm. Further, the stimulable phosphor layer contains an alkali halide stimulable phosphor represented by a formula selected from the group consisting of the following Formulae (1) to (3).

$$M(I)X \cdot aM(II)X'_2 \cdot bM(III)X''_3 : cA \qquad \text{Formula (1)}$$

wherein M(I) is Rb or Cs; M(II) is a divalent metal selected from the group consisting of Mg, Ca, Sr, Ba, Zn, Cd and Ni; M(III) is a trivalent metal selected from the group consisting of Sc, Y, La, Pm, Lu, Al, Ga and In; each of X, X' and X" is a halogen selected from the group consisting of Cl, Br and I; A is an activator selected from the group consisting of Eu, In, Ga, Tb, Ce, Tm, Dy, Pr, Ho, Nd, Yb, Er Gd, Sm, Tl, Na, Ag and Cu; a is a numeric value in the range of 0<a<0.5, provided that a is a numeric value in the range of 0<a<0.25 when A is Eu; b is a numeric value in the range of 0≦b<0.5; and c is a numeric value in the range of 0<c≦0.2.

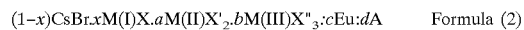
$$(1-x)CsBr \cdot xM(I)X \cdot aM(II)X'_2 \cdot bM(III)X''_3 : cEu : dA \qquad \text{Formula (2)}$$

wherein M(I) is Rb or Cs; M(II) is a divalent metal selected from the group consisting of Be, Mg, Ca, Sr and ba; M(III) is a trivalent metal selected from the group consisting of Y, La, Lu, Al, Ga and In; each of X, X' and X" is a halogen selected from the group consisting of F, Cl, Br and I; each of Eu and A is an activator, and the activator A is a metal selected from the group consisting of In, Ga, Tb, Ce, Tm, Dy, Pr, Ho, Nd, Yb, Er, Gd, Sm, Tl, Na, Ag and Cu; and each x, a, b, c and d is a numeric value in the range of 0≦x≦0.4, 0.7≦x≦1.0, 0≦a≦0.5, 0≦b<0.5, 0<C<0.2 and 0≦d<0.2.

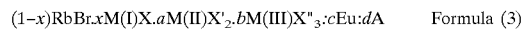
$$(1-x)RbBr \cdot xM(I)X \cdot aM(II)X'_2 \cdot bM(III)X''_3 : cEu : dA \qquad \text{Formula (3)}$$

wherein M(I) is Rb or Cs; M(II) is a divalent metal selected from the group consisting of Be, Mg, Ca, Sr, Ba, Zn, Cd and Ni; M(III) is a trivalent metal selected from the group consisting of Sc, Y, La, Pm, Lu, Al, Ga and In; each of X, X' and X" is a halogen selected from the group consisting of F, Cl, Br and I; each of Eu and A is an activator, and the activator A is a metal selected from the group consisting of In, Ga, Tb, Ce, Tm, Dy, Pr, Ho, Nd, Yb, Er, Gd, Sm, Na, Ag, Cu, Pb, Bi, and Mn; and each x, a, b, c and d is a numeric value in the range of 0≦x≦0.4, 0.7≦x≦1.0, 0≦a≦0.5, 0≦b<0.5, 0<C<0.2 and 0≦d<0.2.

Structure 2

A radiation image conversion panel comprising a support provided thereon a stimulable phosphor layer and a protective layer of the stimulable phosphor layer, the protective layer including an alumina-evaporated layer. The protective layer has a light transmittance of not more than 80% to light having a wavelength of not more than 400 nm and has a light transmittance of not less than 80% to light having a wavelength of not less than 410 nm. Further, the stimulable phosphor layer comprises an alkali halide stimulable phosphor having a maximum emission in a wavelength of not less than 410 nm. The maximum emission of the alkali halide stimulable phosphor is preferably not less than 430 nm, and is more preferably 440 to 500 nm.

Structure 3

The radiation image conversion panel described in above Structure 1, wherein the protective layer has a light transmittance of not more than 70% to light having a wavelength of not less than 400 nm.

Structure 4

The radiation image conversion panel described in above Structure 2, wherein the protective layer has a light transmittance of not more than 70% to light having a wavelength of not less than 400 nm.

Structure 5

The radiation image conversion panel described in above Structure 1, wherein the alkali halide stimulable phosphor is represented by Formula (1), and A is divalent Eu.

Structure 6

The radiation image conversion panel described in above Structure 1, wherein A is monovalent In.

Structure 7

The radiation image conversion panel described in above Structure 1, wherein A is monovalent Ga.

Structure 8

The radiation image conversion panel described in above Structure 1, wherein the protective layer comprises a film and the alumina-evaporated layer is provided on the film.

Structure 9

The radiation image conversion panel described in above Structure 8, wherein the support and the stimulable phosphor layer on the support are wholly sealed with the protective layer.

Structure 10

The radiation image conversion panel described in above Structure 2, wherein the protective layer comprises a film support and the alumina-evaporated layer is provided by evaporating alumina on the film support.

Structure 11

The radiation image conversion panel described in above Structure 10, wherein the support and the stimulable phosphor layer on the support are wholly sealed with the protective layer.

Structure 12

The radiation image conversion panel described in above Structure 1, wherein the protective layer is the alumina-evaporated layer and the alumina-evaporated layer is provided by directly evaporating alumina on the stimulable phosphor layer.

Structure 13

The radiation image conversion panel described in above Structure 1, wherein the protective layer is the alumina-evaporated layer and the alumina-evaporated layer is provided by directly evaporating alumina on the stimulable phosphor layer.

DETAILED DESCRIPTION OF THE INVENTION

Figure 1:
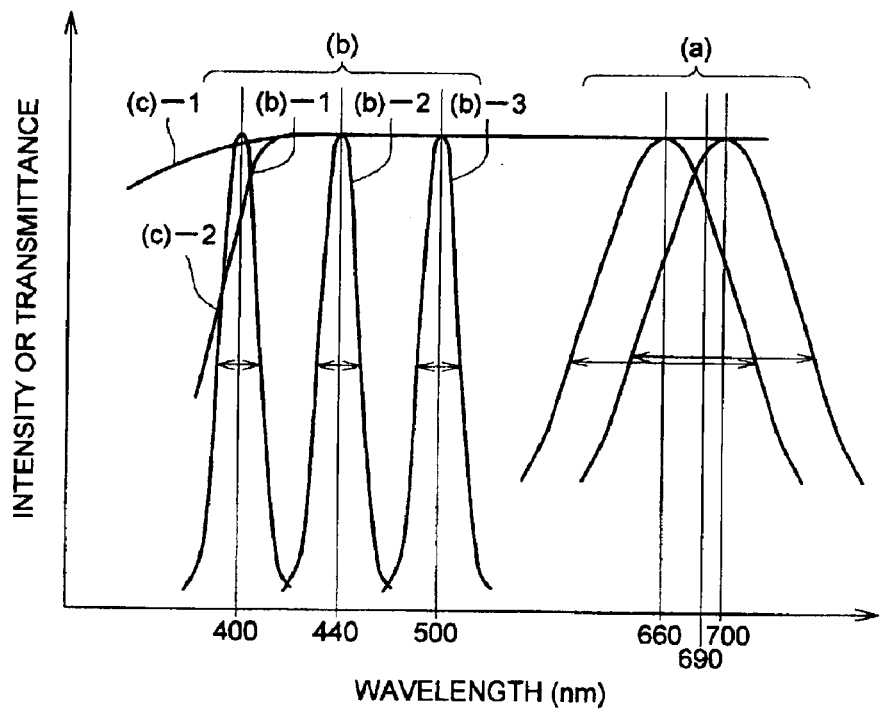
FIG. 1 is a schematic view showing the wavelength region of the stimulation spectrum of a stimulable phosphor and the emission spectrum.

The present invention will now be detailed.

The inventors of the present invention performed various investigations and discovered the radiation image conversion panel described below. The radiation image conversion panel comprises a support having thereon at least a stimulable phosphor layer and a protective layer of said stimulable phosphor layer, and is characterized in that said stimulable phosphor layer comprises an specific alkali halide stimulable phosphor, and further said protective layer is an alumina-evaporated layer having the characteristics of the present invention. The resulting radiation image conversion panel exhibits the effects described in the present invention, namely high moisture resistance, resulting in sufficient emitted light intensity and high image sharpness.

<<Stimulable Phosphor Layer>>

The stimulable phosphor layer according to the present invention may be a coating type phosphor layer which is formed through coating, employing a coating composition comprised of phosphor particles and polymer resins and an evaporation (or deposition) type phosphor layer, which is formed employing methods such as vacuum evaporation and sputtering.

(Preparation of Coating Type Phosphor Layer)

The coating type phosphor layer is comprised mainly of phosphor particles and polymer resins (hereinafter occasionally referred to as binders), and is formed through application onto a support employing a coater. Preferably employed as stimulable phosphors capable of being used in the coating type phosphor layer are those which result in stimulated emission in the wavelength region of 410 to 500 nm, employing stimulation light in the wavelength region of 500 to 900 nm.

Listed as examples of binders employed herein may be binders represented by proteins such as gelatin, polysaccharides such as dextran and natural polymers such as Gum Arabic and synthetic polymers such as polyvinyl butyral, polyvinyl acetate, nitrocellulose, ethylcellulose, vinylidene chloride-vinyl chloride copolymers, polyalkyl (meth) acrylate, vinyl chloride-vinyl acetate copolymers, polyurethane, cellulose acetate butyrate, polyvinyl alcohol, and linear polyester.

Of the binders listed above, those, which are particularly preferred, include nitrocellulose, linear polyester, polyalkyl (meth)acrylate, mixtures of nitrocellulose and linear polyester, mixtures of nitrocellulose and polyalkyl (meth) acrylate, and mixtures of polyurethane and polyvinyl butyral. Incidentally, these binders may be subjected to cross linking. The stimulable phosphor layer may be formed on a sublayer, employing, for example, the method described below.

Initially, stimulable phosphors and binders are added to a suitable solvent and the resulting mixture is sufficiently blended. Subsequently, a coating composition is prepared in which phosphor particles and particles of said compound are uniformly dispersed in the binder solution.

It is preferable that the binders are employed in an amount range of 0.01 to 1 part by weight with respect to parts by weight of the stimulable phosphors. However, from the viewpoint of enhancing sensitivity as well as sharpness of the resulting radiation image conversion panel, the less the amount of binders, the more preferred. Based ease of coating, the range is preferably from 0.03 to 0.2 part by weight.

Listed as examples of solvents employed to prepare the stimulable phosphor layer coating composition are lower alcohols such as methanol, ethanol, isopropanol, and n-butanol; ketones such as acetone, methyl ethyl ketone, methyl isobutyl ketone, and cyclohexanone; esters of lower fatty acids with lower alcohols such as methyl acetate, ethyl acetate, and n-butyl acetate; ethers such as dioxane, ethylene glycol monoethyl ether, ethylene glycol monomethyl ether; aromatic compounds such as triol and xylol; halogenated hydrocarbons such as methylene chloride and ethylene chloride; and mixtures thereof.

Incidentally, in order to enhance dispersibility of phosphors in the aforesaid coating composition and the bonding force between binders and phosphors in the resulting stimulable phosphor layer, various additives such as plasticizers may be incorporated in the coating composition. Listed as dispersing agents to achieve such purposes may be, for example, phthalic acid, stearic acid, caproic acid, and oleophilic surface active agents. Listed as plasticizers may be, for example, phosphoric acid esters such as triphenyl phosphate, cresyl phosphate, and diphenyl phosphate; phthalic acid esters such as diethyl phthalate and dimethoxyethyl phthalate; glycolic esters such as ethyl phthalyl ethyl glycolate and butyl phthalyl butyl glycolate; and polyesters of polyethylene glycol with aliphatic dibasic acids such as polyesters of triethylene glycol with adipic acid and polyester of diethylene glycol with succinic acid.

Subsequently, the coating composition prepared as above is uniformly applied onto the surface of the sublayer, whereby a layer of the coating composition is formed. The coating operation may be carried out employing conventional coating means such as a doctor blade, a roll coater, or a knife coater.

Subsequently, the resulting coating is gradually heated and dried, whereby the formation of the stimulable phosphor layer on the sublayer is completed.

The stimulable phosphor layer coating composition is prepared employing a homogenizer such as a ball mill, a sand mill, an attritor, a three-roller mill, a high-speed impeller homogenizer, a Kady mill, and an ultrasonic homogenizer. The prepared coating composition is applied onto a support employing a doctor blade, a roll coater, or a knife coater, and subsequently dried, whereby a stimulable phosphor layer is formed.

The thickness of the coating type stimulable phosphor layer differs depending on target characteristics of radiation image conversion panels, the types of stimulable phosphors, and the mixing ratio of binders and stimulable phosphors. However, the thickness is preferably within the range of 10 to 1,000 $\mu$m and more preferably 10 to 500 $\mu$m.

(Preparation of Evaporated Type Phosphor Layer)

It is possible to form a stimulable phosphor layer utilizing alkali halide stimulable phosphors while employing methods such as vacuum evaporation and sputtering.

For the radiation image conversion panel of the present invention, alkali halide phosphors are preferred which result in high luminance as well as high image quality. CsBr based phosphors or RbBr based phosphors are particularly preferred.

Methods to form the evaporated type phosphor layer on a support include, for example, a method in which stimulable phosphor vapor or raw materials are supplied onto a support at a specified incident angle and gas phase growth (sedimentation) such as vacuum evaporation is performed.

By employing such a method, it is possible to prepare a stimulable phosphor layer comprised of independent thin, long columnar crystals. It is possible to grow the aforesaid columnar crystals at approximately one half of the growth angle with respect to the incident angle of stimulable phosphor vapor flow during vacuum evaporation. Further, by performing vacuum evaporation at approximately room temperature, it is possible to provide a molecular vacuum evaporation layer.

Methods for supplying the stimulable phosphor vapor flow at a certain incident angle with respect to the support surface include a method in which a support is arranged to be inclined with respect to the crucible charged with vaporization source materials, or a method in which a support and a crucible are arranged parallel to each other and vacuum evaporation is regulated so that only components from the evaporation surface in the crucible charged with evaporation source, which is oblique by a slit is employed.

In such cases, it is appropriate that the distance of the shortest section between the support and the crucible is determined to be from about 10 to about 60 cm so as to match the average flight distance of the stimulable phosphor. Incidentally, as the temperature of the support decreases, the thickness of the columnar crystal tends to also decrease.

The stimulable phosphor employed as an evaporation source is charged into a crucible while uniformly dissolved or molded employing press and hot press. In such case, it is preferable to carry out a degassing treatment. The stimulable phosphor is evaporated from the evaporation source, employing electron beam scanning emitted from an electron gun. However, evaporation may be carried out employing other methods.

Further, the evaporation source need not always be stimulable phosphors and may be those which are prepared by mixing raw materials of the stimulable phosphors.

Still further, the base body of the phosphor may be doped with activators later. For example, after vacuum-evaporating only RbBr, Eu as an activator may be doped. Namely, since crystals are independent of each other, it is possible to conduct doping even though the layer is thick. Further, since crystal growth tends not to occur, MTF (Modulation Transfer Function) does not decrease.

Doping may be carried out in such a manner that the formed phosphor base body layer is doped with doping agents (activators) employing thermal diffusion or an ion injection method.

In the stimulable phosphor layer comprised of the aforesaid columnar crystals, in order to decrease the haze ratio, the size of columnar crystals (which refers to the average of the diameter of the circle which has the same area as the cross-sectional area of each of a columnar crystal when the columnar crystal is viewed from a plane parallel to the support, and which is determined employing a microscope photograph including at least 100 columnar crystals in the visual field) is preferably from about 1 to about 50 $\mu$m, and is more preferably from 1 to 30 $\mu$m.

Further, the spacing between columnar crystals is preferably at most 30 $\mu$m, and is more preferably at most 5 $\mu$m. Namely, when it exceeds 30 $\mu$m, the resulting sharpness is degraded due to an increase in laser beam scattering in the phosphor layer.

Still further, the growth angle of the oblique columnar crystal of the stimulable phosphor may be acceptable if it is from 0 to 90 degrees. However, the angle is preferably from 10 to 70 degrees, and is more preferably from 20 to 55 degrees. In order to adjust the growth angle from 10 to 70 degrees, the incident angle may be adjusted from 20 to 80 degrees, while in order to adjust the growth angle from 20 to 55 degrees, the incident angle may be adjusted from 40 to 70 degrees. An excessively large growth angle results in an increase in brittleness of the layer so that columnar crystals are excessively oblique with respect to the support.

Methods in which the stimulable phosphor is subjected to gas phase growth (sedimentation) include a vacuum evaporation method, a sputtering method, and the CVD (Chemical Vapor Deposition) method.

The vacuum evaporation method will now be described. After placing a support in a vacuum evaporation apparatus, the interior pressure of the apparatus is lowered to degree of vacuum of approximately $1.333 \times 10^{-4}$ Pa. Subsequently, at least one stimulable phosphor is thermally evaporated employing methods such as a resistance heating method or an electron beam method so that the stimulable phosphor is subjected to oblique sedimentation, to achieve the desired thickness. As a result, a stimulable phosphor layer is formed which does not comprise binders. It is possible to form such a stimulable phosphor layer while employing the vacuum evaporation process a plurality of times of. Further, in the aforesaid vacuum evaporation process, it is possible to perform vacuum evaporation employing a plurality of resistance heating units or electron beams. Still further, in a vacuum evaporation method, it is possible that stimulable phosphor raw materials are subjected to vacuum evaporation, employing a plurality of resistance heating units or electron beams so that the target stimulable phosphor is synthesized on a support, and at the same time, a stimulable phosphor layer is formed. Further, in the vacuum evaporation method, during the aforesaid vacuum evaporation, if desired, the vacuum evaporating body may be either cooled or heated. Still further, after vacuum evaporation, the resulting stimulable phosphor layer may be subjected to thermal treatment.

The sputtering method will now be described. A support is arranged in a sputtering apparatus in the same manner as in the vacuum evaporation method. Thereafter, air in the interior of the apparatus is temporarily removed to achieve a vacuum of a pressure of approximately $1.333 \times 10^{-4}$ Pa. Subsequently, inert gas such as Ar or Ne is fed into the apparatus to achieve a gas pressure of approximately $1.333 \times 10^{-1}$ Pa. Thereafter, employing the aforesaid stimulable phosphor as a target, oblique sputtering is performed so that the stimulable phosphor is subjected to oblique sedimentation on the support surface to the desired thickness. In the sputtering process, it is possible to form a stimulable phosphor layer over a plurality of times of the sputtering process in the same manner as the vacuum evaporation method. It is possible to form a stimulable phosphor layer by sputtering the aforesaid target while employing each simultaneously or successively. Further, in the sputtering method, it is possible that a plurality of stimulable phosphor raw materials is employed as a target and a target stimulable phosphor layer is formed on a support by sputtering the raw materials simultaneously or successively. If desired, reactive sputtering may be performed while introducing gas such as $O_2$ or $N_2$. Further, in the sputtering method, if desired, during sputtering, the sputtering body may be either cooled or heated. Still further, after sputtering, the resulting stimulable phosphor layer may be subjected to thermal treatment.

The CVD method is a method in which a stimulable phosphor layer comprising no binder is formed on a support in such a manner that organic metal compounds comprised of target stimulable phosphors or stimulable phosphor raw materials are decomposed employing energy such as heat or high frequency electric power. It is possible to prepare a stimulable phosphor layer which is comprised of independent, thin and long columnar crystals exhibiting the specific inclination to the normal direction of the support while employing gas phase growth.

The thickness of the stimulable phosphor layers prepared by such a method varies depending on the radiation sensitivity of the radiation image conversion panel desired and the types of stimulable phosphors. However, the thickness is preferably selected from the range of 10 to 1,000 μm, and is more preferably selected from the range of 20 to 800 μm.

<<Alkali Halide Stimulable Phosphors>>

Alkali halide stimulable phosphors used in the present invention will now be described.

Preferably employed as an alkali halide stimulable phosphor according to the present invention is at least one type selected from the group consisting of Formulas (1) through (3) described above.

The alkali halide stimulable phosphors represented by aforesaid Formulae (1) through (3) may be prepared while referring to the methods described in Japanese Patent Publication Nos. 07-084588, 07-084589, 07-084591, and 05-014751, and Japanese Patent Application Open to Public Inspection No. 61-071212.

Radiation image conversion panels prepared employing stimulable phosphors represented by aforesaid Formulae (1) through (3) exhibit desired moisture resistance. Further, when a protective layer (the relationship between the water-vapor permeability and the light transmittance of the protective layer will be described below) comprising an alumina-evaporated layer having absorption, which hinders light emission from conventional stimulable phosphors, is used, the aforesaid panels are preferably employed due to light emission with desired luminance. Of these, stimulable phosphors are preferably employed which are provided with divalent Eu (europium), monovalent In (indium), and further monovalent Ga (gallium) as an activator.

Reasons why the stimulable phosphors utilized in the present invention are preferred will now be described, with reference to FIG. 1.

FIG. 1 is a schematic view showing the wavelength region of stimulable phosphor stimulation spectrum and its emission spectrum.

In FIG. 1, (a) shows the shape and wavelength region of stimulation spectra of a conventional alkali halide stimulable phosphor and an alkali halide stimulable phosphor used in the present invention. The wavelength region of the stimulation spectra is in the range of about 660 to about 700 nm.

Further, (b)-1 shows the emission spectrum of europium activated barium fluoride $(BaFBr):Eu^{2+}$, conventionally known in the art, which exhibits a maximum at 400 nm, while (b)-2 shows one example of emission spectra of a compound having $Eu^{+2}$ and $In^{+1}$ as activators in the alkali halide stimulable phosphors according to the present invention, which exhibits a maximum at 440 nm. Further, (b)-3 shows the emission spectrum of the representative compound (CsBr:Ga) having $Ga^{+1}$ as an activator in the alkali halide stimulable phosphors used in the present invention, which is found to exhibit a maximum at 500 nm.

In FIG. 1, (c)-1 and (c)-2 each shows light transmittance of the protective layer having an alumina-evaporated layer used in the present invention. The protective layer, which exhibits light transmittance shown by (c)-1, results in high light transmittance in the wavelengths of the emission spectra region of the alkali halide stimulable phosphors used in the present invention. However, it is impossible to sufficiently minimize degradation of alkali halide stimulable phosphors due to moisture absorption since the water vapor permeability, described below, is high.

On the other hand, the protective layer, which exhibits light transmittance shown by (c)-2, has light absorption in the wavelength region of the emission spectra (b)-1 of conventional stimulable phosphors, known in the art, whereby emission from the stimulable phosphor is absorbed. As a result, a marked decrease in sensitivity results. However, the emission spectra of the alkali halide stimulable phosphors according to the present invention result in maximum emission in the wavelength of not less than 410 nm, whereby the resulting emission is not absorbed by the protective layer. As a result, no decrease in sensitivity occurs and further, it is possible to minimize the decrease in sensitivity due to moisture absorption employing a protective layer exhibiting sufficient moisture resistance.

Herein, stimulable phosphor stimulation spectra as well as emission spectra of radiation image conversion panels are determined as described below.

<<Determination of Stimulable Phosphor Stimulation Spectra of Radiation Image Conversion Panel>>

After exposing X-rays onto a radiation image conversion panel under the conditions described below, stimulation light was exposed onto the surface of the stimulable phosphor while varying the wavelength, employing a commercially available fluorospectrophotomer, whereby the resulting emission intensity was determined. Subsequently, a stimulable phosphor stimulation spectrum was plotted using the stimulation light wavelengths versus the emission intensity.

X-ray exposure conditions: 80 kV, 200 mA, and 60 seconds

Fluorometer: slit width stimulation light of 1.5 nm and emission light of 1.5 nm Wavelength scanning rate: 60 nm/minute <<Determination of Emission Spectra of Radiation Image Conversion Panel>>

Ultraviolet radiation was exposed to a radiation image conversion panel under the following conditions. In such a case, the resulting emission was subjected to spectral measurement, whereby an emission spectrum was recorded.

Radiation exposure condition: 320 nm (ultraviolet radiation)

Fluorometer: slit width excitation light of 1.5 nm and emission light of 1.5 nm

Wavelength scanning rate: 60 nm/minute

<<Protective Layer Comprising Alumina-Evaporated Layer>>

The protective layer comprising an alumina-evaporated layer used in the present invention will now be described.

(Moisture Permeability of Protective Layer: Water Vapor Permeability)

In the present invention, from the viewpoint of minimizing degradation due to moisture absorption of stimulable phosphors, the protective layer comprising the alumina-evaporated layer according to the present invention is provided with moisture resistance. Specifically, moisture permeability (occasionally referred to as water vapor permeability) is preferably at most 50 $g/m^2 \cdot day$, is more preferably at most 10 $g/m^2 \cdot day$, and is most preferably at most 1 $g/m^2 \cdot day$. Herein, it is possible to measure the moisture permeability of the protective layer while referring to the method specified in JIS Z 0208. Further, in accordance with aforesaid JIS Z 0208, it is possible to measure the moisture permeability of the protective layer comprised of an alumina-evaporated layer directly provided on the stimulable phosphor layer. Concretely, the moisture permeability in the present invention is measured in the method described below. The protective layer is set to be an interface of two vapor phases. One of the vapor phases is kept in an relative humidity of 90%, and the other vapor phase is kept in dried state utilizing a moisture absorbing agent under 40° C. Under the condition, the weight amount (g) of the water vapor passing the protective layer for 24 hours (while the protective layer is converted to 1 $m^2$) is defined as the moisture permeability of the protective layer in the present invention.

A preferable evaporated film is prepared as follows. Moisture permeability of the protective layer is adjusted to the aforesaid range. Further, from the viewpoint of enhancing moisture resistance, a thin alumina layer is evaporated onto polyethylene terephthalate film.

(Percentage Light Transmittance of Protective Layer(%))

Light transmittance of the protective layer, as described herein, is represented employing the relative value of the light transmittance of each protective layer while the light transmittance of air is set at 100 percent.

The aforesaid light transmittance is obtained based on the formula described below.

Light transmittance(percent)=(transmitted light/incident light)×100

Definite correlation is held between the moisture permeability (water vapor permeability) of the protective layer comprised of an alumina-evaporated layer and the light transmittance of the aforesaid protective layer, which will be described with reference to FIG. 2.

Figure 2:
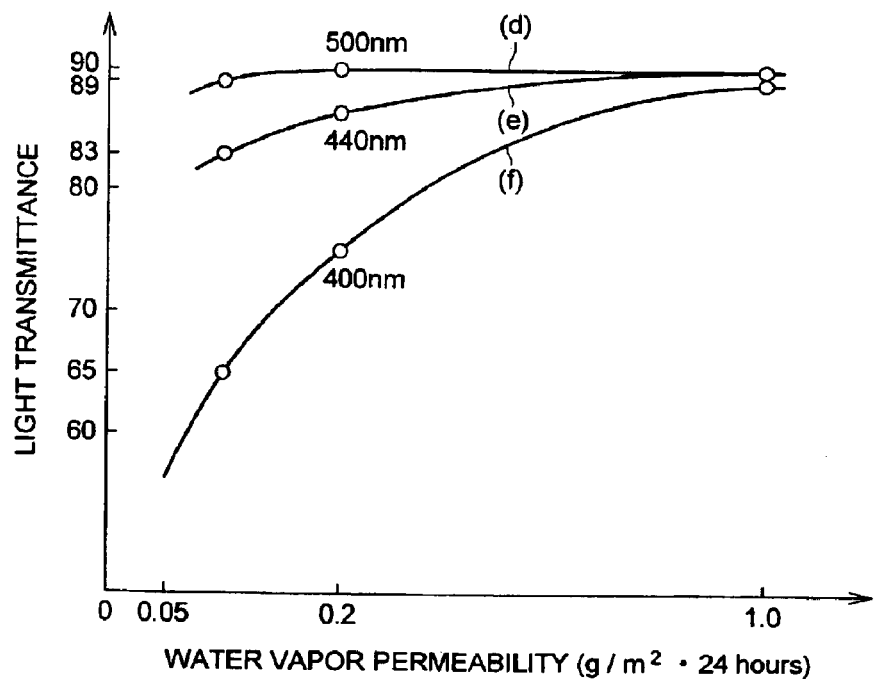
FIG. 2 is a schematic view showing the relationship between the light transmittance and the water vapor permeability of a protective layer comprised of an alumina vacuum evaporated layer on polyethylene terephthalate film.

FIG. 2 is a schematic view showing the relationship between the light transmittance and the water vapor permeability of a protective layer comprised of an alumina-evaporated layer on polyethylene terephthalate film.

In FIGS. 2, (d), (e), and (f) each shows the relationship between the light transmittance and the water vapor permeability of a protective layer with respect to light of 500 nm, 440 nm, and 400 nm. With regard to 500 nm light, it is seen that even though the evaporated layer is prepared so as to result in a water vapor permeability of 0.05 $g/m^2 \cdot day$, the decrease in the light transmittance is relatively small. On the other hand, with 400 nm light, it is seen that when the evaporated layer is prepared so as to result in a water vapor permeability of 0.05 $g/m^2 \cdot day$, it is possible to provide markedly high moisture resistance, while the resulting light transmittance decreases in the vicinity of 65 percent.

Incidentally, the method for adjusting the moisture permeability and the light transmittance of the protective layer is not specifically limited. For example, the properties can be adjusted by controlling a oxidation degree of the aluminum by changing the pressure of the air or the partial pressure of oxygen gas during the vacuum evaporation of the alumina.

As noted above, in order to provide radiation image conversion panels with high moisture resistance while decreasing the moisture permeability of the protective layer, as well as to result in high luminance, while minimizing a decrease in light transmittance, it was found that longer wavelength emission spectra of stimulable phosphors are preferable.

The entire stimulable phosphor layer may be sealed with a protective layer comprised of alumina-evaporated layer used in the present invention, which is larger than the stimulable phosphor area, while employing any of the conventional methods known in the art. By employing thermally fusible resins in the outermost layer on the side which comes into contact with the stimulable phosphor layer on the protective layer side, protective layers may be fused to each other. As a result, it is possible to efficiently seal the periphery of the stimulable phosphor layer. Thus, it is possible to more effectively minimize degradation of desired characteristics of the stimulable phosphor due to moisture absorption.

It is more preferable that protective layer members are provided on the support, opposite with respect to the stimulable phosphor layer, and the peripheral sections are then sealed. By so doing, it is possible to effectively minimize moisture penetration from the opposite side of the support surface, carrying thereon the stimulable phosphor layer.

In addition, an embodiment is preferably employed in which the aforesaid protective layer comprises a layer comprising the aforesaid thermally fusible resin containing layer, only in the section required for the aforesaid sealing.

Further, as protection members on the support surface side opposite the side on which the stimulable phosphor layer is provided, film which is prepared by laminating at least one aluminum film is effective in minimizing moisture penetration.

Still further, it is preferable that the thermally fusible resinous layer, which is the outermost layer on the side which comes into contact with the stimulable phosphor layer, of the protective layer is substantially not adhered to the phosphor surface.

"The protective layer is substantially not adhered to the stimulable phosphor layer", as described herein, refers to the state in which both layers are not optically integrated. More specifically, it refers to the state in which even though the stimulable phosphor layer microscopically comes into point contact with the sealing materials, it is possible to optically and dynamically treat the stimulable phosphor layer and the protective film as a discontinuous body.

Concretely, in the aforesaid sealing structure, it is assumed that the stimulable phosphor layer and the moisture resistant protective layer are in microscopic contact with each other at various points. However, when the total contact area is at most 10 percent with respect to the area of the phosphor layer, in the present invention, it is defined that no substantial contact occurs.

The thermally fusible film, as described herein, refers to a resinous film which is capable of being fused employing a commonly impulse sealer, and includes, for example, ethylene-vinyl acetate copolymers (EVA), polypropylene (PP) film, and polyethylene (PE) film. However, the present invention is not limited to these examples.

Further, in order to seal the radiation image conversion panel which has been cut into the specified size, while employing sealing materials, any known methods may be employed. Methods include, for example, one in which a radiation image conversion panel is interposed by upper and lower sealing materials and the peripheral section is subjected to thermal fusion employing an impulse sealer, and a laminating method in which pressure is applied by two heating rollers.

In the aforesaid method in which thermal fusion is carried out employing an impulse sealer, it is preferable to carry out the thermal fusion under an ambience of reduced pressure in order to minimize position deviation in the protective layer of the phosphor sheet, as well as to remove any ambient moisture.

(Haze Ratio of the Protective Layer)

The haze ratio of the protective layer according to the present invention will now be described.

From the viewpoint of enhancing moisture resistance and further specifically to enhance sharpness as well as to decrease image unevenness and linear noise of the radiation image conversion panel of the present invention, the haze ratio of sealing materials is adjusted preferably within the range of 5 to 60 percent, more preferably 5 to 50 percent, and most preferably 5 to 30 percent.

It is possible to measure the haze ratio of the protective layer, as described herein, employing the method specified in ASTMD-1003. It is possible to adjust the haze ratio of the protective layer according to the present invention while referring to the haze ratio of used resinous films. Further, resinous films having a desired haze ratio are commercially available.

<<Supports>>

The supports according to the present invention will now be described.

Employed as supports are various types of polymers, glass and metals. Of these, preferred are, for example, plate glass such as quartz, boro-silicate glass, and chemically tempered glass; plastic film such as cellulose acetate film, polyester film, polyethylene terephthalate film, polyethylene naphthalate film, polyamide film, polyimide film, triacetate film, and polycarbonate film; metal sheets comprised of aluminum, iron, copper, and chromium; and metal sheets carrying a coating layer comprised of minute hydrophilic particles. The surface of these supports may be a smooth surface or a matte surface in order to improve adhesion to the stimulable phosphor layer. Further, in the present invention, in order to enhance adhesion between the support and the stimulable phosphor layer, if desired, an adhesion layer may be provided on the support surface.

Further, the thickness of these supports will differ depending on materials of the supports, but is commonly from 80 to 1,000 μm. From the viewpoint of ease of handling, the thickness is more preferably from 80 to 500 μm. The surface of these supports may be a smooth surface and may be a matte surface for the purpose of enhancing adhesion to the stimulable phosphor layer.

In addition, for the purpose of enhancing adhesion to the stimulable phosphor layer, a sublayer may be provided on the surface of which the stimulable phosphor layer is provided.

Listed as examples of binders employed in the stimulable phosphor layer according to the present invention may be binders represented by proteins such as gelatin, polysaccharides such as dextran and natural polymers such as Gum Arabic and synthetic polymers such as polyvinyl butyral, polyvinyl acetate, nitrocellulose, ethyl cellulose, vinylidene chloride-vinyl chloride copolymers, polyalkyl (meth) acrylate, vinyl chloride-vinyl acetate copolymers, polyurethane, cellulose acetate butyrate, polyvinyl alcohol, and linear polyester.

Of the binders described above, those which are particularly preferred include nitrocellulose, linear polyester, polyalkyl (meth)acrylate, mixtures of nitrocellulose and linear polyester, mixtures of nitrocellulose and polyalkyl (meth) acrylate, and mixtures of polyurethane and polyvinyl butyral. Incidentally, these binders may be subjected to cross linking. The stimulable phosphor layer may be formed on a sublayer, employing, for example, the method described below.

First, stimulable phosphors and binders are added to a suitable solvent and the resulting mixture is sufficiently blended. Subsequently, a coating composition is prepared in which phosphor particles and particles of said compound are uniformly dispersed in the binder solution.

Binders are commonly employed in an amount ranging from 0.01 to 1 part by weight with respect to part by weight of the stimulable phosphors. However, from the viewpoint of enhancing sensitivity as well as sharpness of the resulting radiation image conversion panel, the less the amount of binders, the more preferred. Based on compatibility of ease of coating, the range is preferably from 0.03 to 0.2 part by weight.

Listed as examples of solvents employed to prepare the stimulable phosphor layer coating composition are lower alcohols such as methanol, ethanol, isopropanol, and n-butanol; ketones such as acetone, methyl ethyl ketone, methyl isobutyl ketone, and cyclohexanone; esters of lower fatty acids with lower alcohols such as methyl acetate, ethyl acetate, and n-butyl acetate; ethers such as dioxane, ethylene glycol monoethyl ether, ethylene glycol monomethyl ether; aromatic compounds such as triol and xylol; halogenated hydrocarbons such as methylene chloride and ethylene chloride; and mixtures thereof.

Incidentally, in order to enhance dispersibility of phosphors in the aforesaid coating composition and the bonding force between binders and phosphors in the resulting stimulable phosphor layer, various additives such as plasticizers may be incorporated in the coating composition. Listed as dispersing agents to achieve such purposes may, for example, be phthalic acid, stearic acid, caproic acid, and oleophilic surface active agents. Listed as plasticizers may be, for example, phosphoric acid esters such as triphenyl phosphate, cresyl phosphate, and diphenyl phosphate; phthalic acid esters such as diethyl phthalate and dimethoxyethyl phthalate; glycolic esters such as ethyl phthalyl ethyl glycolate and butyl phthalyl butyl glycolate; and polyesters of polyethylene glycol with aliphatic dibasic acids such as polyesters of triethylene glycol with adipic acid and polyester of diethylene glycol with succinic acid.

Subsequently, the coating composition prepared as above is uniformly applied onto the surface of the sublayer, whereby a coating of the coating composition is formed. Coating operation may be carried out employing conventional coating means such as a doctor blade, a roll coater, and a knife coater.

Subsequently, the resulting coating is gradually heated and dried, whereby the formation of the stimulable phosphor layer on the sublayer is completed. The thickness of the stimulable phosphor layer differs depending on desired characteristics of target radiation image conversion panels, the types of stimulable phosphors, and the mixing ratio of binders to phosphors, but is commonly from 20 μm to 1 mm. Further, the aforesaid layer thickness is preferably set from 50 to 500 μm.

The stimulable phosphor layer coating composition is prepared employing a homogenizer such as a ball mill, a sand mill, an attriter, a three-roller mill, a high-speed impeller homogenizer, a Kady mill, and an ultrasonic homogenizer. The prepared coating composition is applied onto a support employing a doctor blade, a roll coater, and a knife coater, and subsequently dried, whereby a stimulable phosphor layer is formed.

The thickness of the coating type stimulable phosphor layer differs depending on target characteristics of radiation image conversion panels, the types of stimulable phosphors, and the mixing ratio of binders and stimulable phosphors. However, the thickness is preferably selected from the range of 10 to 1,000 μm and is more preferably selected from the range of 10 to 500 μm.

The phosphor sheet, which comprises a support having thereon a coated phosphor layer, is cut to the specified size. Any conventional methods may be applied to the cutting. However, from the viewpoint of workability as well as accuracy, trimming cutters and die cutters are preferred.

EXAMPLES

The present invention will now be described with reference to examples. However, the present invention is not limited to these examples.

Example 1

<<Preparation of Radiation Image Conversion Panel 1>> Vacuum Evaporated Type

Radiation Image Conversion Panel 1 was prepared employing the method described below.
(Preparation of Support 1)

A light reflection layer was provided on a glass ceramics having a thickness of 500 μm as described below, whereby Support 1 was prepared.
(Formation of Light Reflection Layer)

A layer was formed on the support surface employing titanium oxide produced by Furuuchi Kagaku Co. and zirconium oxide also produced by Furuuchi Kagaku Co. while using a vacuum evaporation apparatus so that the resulting reflection ratio at 400 nm and 660 nm were 85 percent and 20 percent, respectively.
(Preparation of Stimulable Phosphor Plate 1)

Support 1, prepared as above, was heated to 240° C. Subsequently, nitrogen gas was fed into a vacuum chamber to result in degree of vacuum of 0.1 Ps. Thereafter, one surface of the support was subjected to vacuum evaporation employing a vacuum evaporation apparatus known in the art in such a manner that an alkali halide phosphor comprised of $CsBr:Eu^{2+}$ was placed so as to form an incident angle of approximately 0 degree (approximately as described herein refers to the range of 0±5 degrees) with respect to the normal direction of the phosphor surface employing an aluminum slit while keeping the distance between the support and the slit (the evaporation source) at 60 cm and transporting the support in the direction parallel to the support. Thus a 300 μm thick columnar structure phosphor layer was formed.

Radiation Image Conversion Panel 1 was prepared employing Stimulable Phosphor Plate 1, prepared as above. In more detail, the phosphor evaporated surface of Stimulable Phosphor Plate 1 was laminated to a 12 μm thick polyethylene terephthalate film having thereon a protective film (a 12 μm thick polyethylene terephthalate film having thereon a 30 nm thick alumina-evaporated layer) exhibiting the transmittance shown in Table 1, employing a commercially available dual liquid reaction type urethane-based adhesive so as to form a 3 μm thick adhesion layer, whereby a protective layer was provided. Herein, the aforesaid protective layer (occasionally referred to as a protective film) was designated as Type A in the present invention.

<<Preparation of Radiation Image Conversion Panels 2 through 8>>: Vacuum Evaporation Type Each of Radiation Image Conversion Panels 2 through 8 was prepared in the same manner as Radiation Image Conversion Panel 1, except that the stimulable phosphor was replaced with the stimulable phosphor having compositions described in Table 1, and the protective layer was replaced with another protective layer described in Table 1.

Incidentally, Protective Layer Type B employed to prepare Radiation Conversion Panels 3 and 5 was prepared as described below.

(Preparation of Protective Layer Type B): Preparation of Protective Film

During preparation of Radiation Image Conversion Panels 3 and 5, a protective layer (occasionally referred to as a protective film) was provided as follows. Constitution (B), described below, having light transmittance shown in Table 1, was applied onto the surface of the vacuum evaporated phosphor of aforesaid Stimulable Phosphor Plate 1, and the peripheral section of the resulting plate was fusion-sealed under reduced pressure, employing an impulse sealer.

Constitution (B)
NY15///VMPET12///VMPET12///PET12///CPP20

NY: nylon
PET: polyethylene terephthalate
CPP: casting polypropylene
VMPET: alumina-evaporated PET (commercially available product, manufactured by Toyo Metalizing Co.)

The numerals following each resin represent the thickness (in μm) of the resinous layer.

Aforesaid "///" means a dry lamination adhesion layer having a 3.0 μm thick adhesive layer. Employed as an adhesive for dry lamination was a dual liquid reaction type urethane-based adhesive.

Further, employed as the protective film on the rear surface side of the support of Phosphor Plate 1 was a dry laminated film having a constitution of CPP30 μm/aluminum film 9 μm/polyethylene terephthalate (PET) 188 μm. Still further, in such a case, employed were a 1.5 μm thick adhesive layer and a dual liquid reaction type urethane-based adhesive.

(Preparation of Protective Layer Type C): Preparation of Protective Film

A protective layer (a protective film), applied directly on the surface of the vacuum evaporated phosphor, which was comprised of a 30 nm thick alumina-evaporated layer having light transmittance shown in Table 1, was designated as Type C.

<<Preparation of Radiation Image Conversion Panel 9>>
Coating Type
(Preparation of Phosphor)

The precursor of a europium activated barium fluoride iodide stimulable phosphor was synthesized as described below. Charged into a reaction vessel were 2,780 ml of an aqueous $BaI_2$ solution (3.6 mol/L) and 27 ml of an aqueous $EuI_3$ (0.15 mol/L) solution. The reaction mother composition in the reaction vessel was maintained at 83° C. while stirring. Subsequently, 322 ml of an aqueous ammonium fluoride solution (8 mol/L) was poured into the reaction mother composition employing a roller pump, whereby precipitates were formed. After pouring, the resulting precipitates underwent ripening while stirred for an additional two hours and maintaining the aforesaid temperature. Subsequently, the precipitates were collected by filtration, washed with ethanol, and then subjected to vacuum drying, whereby europium activated barium fluoride iodide crystals were obtained. In order to minimize variation of particle shape due to sintering during baking and particle size distribution due to fusion among particles, 0.2 percent by weight of ultra-minute alumina powder particles was added and the resulting mixture was sufficiently stirred employing a mixer whereby the ultra-minute alumina particle powder was adhered onto the crystal surfaces. Subsequently, the resulting mixture was charged into a quartz boat, baked at 850° C. for two hours under an atmosphere of hydrogen gas, employing a tube furnace, and then classified, whereby a europium activated barium fluoride iodide phosphor (BaF (Br,I):$Eu^{3+}$), having an average particle diameter of 4 μm, was prepared.

(Preparation of Phosphor Layer Coating Composition)

Added to a methyl ethyl ketone-toluene (1:1) mixed solvent were 100 g of the phosphor prepared as above and 16.7 g of a polyester resin (Biron 63SS having a solid concentration of 30 percent), manufactured by TOYOBO Co., Ltd. The resulting mixture was dispersed employing a propeller mixer, and the viscosity was adjusted to the range of 25 to 30 Pa·s, whereby a phosphor coating composition was prepared.

(Preparation of Phosphor Sheet)

The phosphor layer coating composition, prepared as above, was applied onto a 350 μm thick polyethylene terephthalate support so as to result in a coating width of 1,000 mm and a coating thickness of 230 μm and subsequently dried at 100° C. for 15 minutes, whereby a phosphor layer was formed. Subsequently, the moisture resistant protective film, described below, was provided and Radiation Image Conversion Panel 9 was prepared.

(Preparation of Moisture Resistant Protective Film): Protective Layer Type A

Type A, which was employed in aforesaid Radiation Image Conversion Panel 1, was provided as a moisture resistant protective layer (a protective film). However, light transmittance and water vapor permeability of the protective layer were adjusted as described in Table 1.

<<Preparation of Radiation Image Conversion Panel 10>>:
Coating Type

Radiation Image Conversion Panel 10 was prepared in the same manner as Radiation Image Conversion Panel 9, except that the composition of the stimulable phosphor was varied as described in Table 1.

Each of resulting Radiation Image Conversion Panels 1 through 10 was subjected to evaluation of durability (minimization of a decrease in emission luminance, sharpness, and graininess.

<<Evaluation of Durability>>

Emission luminance of each of Radiation Image Conversion Panels 1 through 10 was determined immediately after its preparation. Subsequently, each of aforesaid Radiation Image Conversion Panels 1 through 10 was set aside at 40° C. and relative humidity of 90 percent for 180 days. Thereafter, the emission luminance was determined and the decrease ratio with respect to the initial luminance was ranked as described below.

A: less than 5 percent
B: more than or equal to 5 percent to less than 20 percent
C: more than or equal to 20 percent (Determination of Luminance (Sensitivity))

Luminance was determined as follows. Tube voltage 80 kVp X-rays were irradiated onto the rear side of each of the radiation image conversion panels. Thereafter, the resulting panel was stimulated employing a semiconductor laser (690 nm) and stimulated emission emitted from the phosphor layer was received employing a light receiving unit (a photomultiplier tube having a spectral sensitivity of S-5), whereby its intensity was determined.

<<Evaluation of Sharpness>>

Modulation transfer function was obtained and subsequently, sharpness was evaluated.

After adhering a CTF chart onto each of the radiation image conversion panels, 80 kVp X-rays were irradiated under 10 mR (the distance to the object of 1.5 m). Subsequently, a semiconductor laser beam (690 nm and 40 mW on the panel) was irradiated on the Phosphor Layer A surface and the CTF chart was scanned employing a φ100 μm semiconductor laser beam. MTF was then obtained based on the reading. Table 1 shows the relative MTF value of each panel when the MTF value of Radiation Image Conversion Panel 1 at 0.51 p/mm was 100.

<<Evaluation of Graininess>>

The graininess of Radiation Image Conversion Panel 1 was evaluated as described below. A radiation image was formed under the X-ray irradiation conditions described below. Subsequently, the resulting radiation image was read while employing each of semiconductor laser beams of 690 nm as a stimulation light. After reading, X-ray solid exposure images, outputted onto a film, were visually evaluated and ranked at the 5 levels described below.

X-ray irradiation conditions: 80 kV, 200 mA, and 0.1 second
Film output condition: γ (gradation)=3.0 output
5: excellent, grains were barely noticeable
4: better, grains were somewhat noticeable
3: good, grains were noticeable
2: grains were easily noticeable
1: grains were clearly noticeable Table 1 shows the results.

TABLE 1

| Radiation Image Conversion Panel No. | Stimulable Phosphor Composition | Protective Layer Type | Light Transmittance (percent) (400 nm) | Water Vapor Permeability (g/m² · day) | Durability (decrease in luminance) | Sharpness | Graininess | Remarks |
|---|---|---|---|---|---|---|---|---|
| 1 | CsBr:Eu$^{2+}$ | A | 65 | 0.1 | A | 100 | 5 | Inv. |
| 2 | RbBr:Eu$^{2+}$ | A | 65 | 0.1 | A | 100 | 5 | Inv. |
| 3 | 0.9CsBr•0.1RbBr:Eu$^{2+}$ | B | 76 | 0.2 | B | 90 | 5 | Inv. |
| 4 | 0.1CsBr•0.9RbBr:Eu$^{2+}$ | A | 65 | 0.1 | A | 95 | 4 | Inv. |
| 5 | CsBr:In$^{2+}$ | B | 65 | 0.1 | A | 96 | 4 | Inv. |
| 6 | CsBr:Ga$^{2+}$ | A | 65 | 0.1 | A | 96 | 5 | Inv. |
| 7 | 0.9CsBr•0.1RbBr:In$^{2+}$ | C | 69 | 0.1 | B | 100 | 4 | Inv. |
| 8 | 0.9CsBr•0.1RbBr:Ga$^{2+}$ | C | 69 | 0.1 | B | 100 | 5 | Inv. |
| 9 | BaFBr:Eu$^{2+}$ | A | 65 | 0.1 | B | 86 | 1 | Comp. |
| 10 | BaF(Br,I):Eu$^{2+}$ | A | 90 | 1.0 | C | 84 | 3 | Comp. |

Inv.: Present Invention, Comp.: Comparative Example

As can clearly be seen from Table 1, samples of the present invention exhibited emission luminance, and graininess under high voltage irradiation conditions as well as under low voltage irradiation conditions, being superior to the comparative examples.

EFFECTS OH THE INVENTION the present invention is capable of providing a radiation image conversion panel which exhibits high moisture resistance, results in desired emission intensity, namely exhibits excellent graininess, and produces images with high sharpness.

What is claimed is:

1. A radiation image conversion panel comprising a support provided thereon a stimulable phosphor layer and a protective layer of the stimulable phosphor layer, the protective layer including an alumina-evaporated layer, wherein the protective layer has a light transmittance of not more than 80% to light having a wavelength of not more than 400 nm and has a light transmittance of not less than 80% to light having a wavelength of not less than 410 nm, and the stimulable phosphor layer contains an alkali halide stimulable phosphor represented by a formula selected from the group consisting of the following Formulae (1) to (3), $$M(I)X.aM(II)X'_2.bM(III)X''_3:cA \qquad \text{Formula (1)}$$

wherein M(I) is Rb or Cs; M(II) is a divalent metal selected from the group consisting of Mg, Ca, Sr, Ba, Zn, Cd and Ni; M(III) is a trivalent metal selected from the group consisting of Sc, Y, La, Pm, Lu, Al, Ga and In; each of X, X' and X" is a halogen selected from the group consisting of Cl, Br and I; A is an activator selected from the group consisting of Eu, In, Ga, Tb, Ce, Tm, Dy, Pr, Ho, Nd, Yb, Er Gd, Sm, Tl, Na, Ag and Cu; a is a numeric value in the range of 0<a<0.5, provided that a is a numeric value in the range of 0<a<0.25 when A is Eu; b is a numeric value in the range of 0≦b<0.5; and c is a numeric value in the range of 0<c≦0.2, $$(1-x)CsBr.xM(I)X.aM(II)X'_2.bM(III)X''_3:cEu:dA \qquad \text{Formula (2)}$$

wherein M(I) is Rb or Cs; M(II) is a divalent metal selected from the group consisting of Be, Mg, Ca, Sr and ba; M(III) is a trivalent metal selected from the group consisting of Y, La, Lu, Al, Ga and In; each of X, X' and X" is a halogen selected from the group consisting of F, Cl, Br and I; each of Eu and A is an activator, and the activator A is a metal selected from the group consisting of In, Ga, Tb, Ce, Tm, Dy, Pr, Ho, Nd, Yb, Er, Gd, Sm, Tl, Na, Ag and Cu; and each x, a, b, c and d is a numeric value in the range of 0≦x≦0.4, 0.7≦x≦1.0, 0≦a≦0.5, 0≦b<0.5, 0<C<0.2 and 0≦d<0.2, $$(1-x)RbBr.xM(I)X.aM(II)X'_2.bM(III)X''_3:cEu:dA \qquad \text{Formula (3)}$$

wherein M(I) is Rb or Cs; M(II) is a divalent metal selected from the group consisting of Be, Mg, Ca, Sr, Ba, Zn, Cd and Ni; M(III) is a trivalent metal selected from the group consisting of Sc, Y, La, Pm, Lu, Al, Ga and In; each of X, X' and X" is a halogen selected from the group consisting of F, Cl, Br and I; each of Eu and A is an activator, and the activator A is a metal selected from the group consisting of In, Ga, Tb, Ce, Tm, Dy, Pr, Ho, Nd, Yb, Er, Gd, Sm, Na, Ag, Cu, Pb, Bi, and Mn; and each x, a, b, c and d is a numeric value in the range of 0≦x≦0.4, 0.7≦x≦1.0, 0≦a≦0.5, 0≦b<0.5, 0<C<0.2 and 0≦d<0.2.

2. A radiation image conversion panel comprising a support provided thereon a stimulable phosphor layer and a protective layer of the stimulable phosphor layer, the protective layer including an alumina-evaporated layer, wherein the protective layer has a light transmittance of not more than 80% to light having a wavelength of not more than 400 nm and has a light transmittance of not less than 80% to light having a wavelength of not less than 410 nm, and the stimulable phosphor layer comprises an alkali halide stimulable phosphor having a maximum emission in a wavelength of not less than 410 nm.

3. The radiation image conversion panel of claim 1, wherein the protective layer has a light transmittance of not more than 70% to light having a wavelength of not less than 400 nm.

4. The radiation image conversion panel of claim 2, wherein the protective layer has a light transmittance of not more than 70% to light having a wavelength of not less than 400 nm.

5. The radiation image conversion panel of claim 1, wherein the alkali halide stimulable phosphor is represented by Formula (1), and A is divalent Eu.

6. The radiation image conversion panel of claim 1, wherein A is monovalent In.

7. The radiation image conversion panel of claim 1, wherein A is monovalent Ga.

8. The radiation image conversion panel of claim 1, wherein the protective layer comprises a film and the alumina-evaporated layer is provided on the film.

9. The radiation image conversion panel of claim 8, wherein the support and the stimulable phosphor layer on the support are wholly sealed with the protective layer.

10. The radiation image conversion panel of claim 2, wherein the protective layer comprises a film support and the alumina-evaporated layer is provided by evaporating alumina on the film support.

11. The radiation image conversion panel of claim 10, wherein the support and the stimulable phosphor layer on the support are wholly sealed with the protective layer.

12. The radiation image conversion panel of claim 1, wherein the protective layer is the alumina-evaporated layer and the alumina-evaporated layer is provided by directly evaporating alumina on the stimulable phosphor layer.

* * * * *